(12) United States Patent
Bendler et al.

(10) Patent No.: US 7,074,857 B2
(45) Date of Patent: Jul. 11, 2006

(54) CURABLE THERMOPLASTIC ELASTOMERIC BLEND, METHOD OF MANUFACTURE, AND USE THEREOF

(75) Inventors: Herbert Vernon Bendler, Wilmington, DE (US); Chun Sing Wong, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 223 days.

(21) Appl. No.: 10/674,305

(22) Filed: Sep. 30, 2003

(65) Prior Publication Data

US 2004/0115450 A1 Jun. 17, 2004

Related U.S. Application Data

(60) Provisional application No. 60/414,708, filed on Sep. 30, 2002.

(51) Int. Cl.
*C08L 67/02* (2006.01)
*C08L 33/06* (2006.01)

(52) U.S. Cl. ...................... 525/176; 525/165

(58) Field of Classification Search ............ None
See application file for complete search history.

(56) References Cited

U.S. PATENT DOCUMENTS

| | | | |
|---|---|---|---|
| 3,396,152 A * | 8/1968 | Henning | 525/345 |
| 3,926,873 A * | 12/1975 | Aishima et al. | 525/36 |
| 4,275,180 A | 6/1981 | Clarke | |
| 4,396,746 A * | 8/1983 | Toga | 525/444 |
| 4,981,908 A | 1/1991 | Wolfe, Jr. | |
| 5,154,979 A | 10/1992 | Kerschbaumer et al. | |
| 5,380,797 A * | 1/1995 | Siol et al. | 525/71 |
| 6,329,463 B1 * | 12/2001 | Abraham et al. | 525/92 A |
| 2002/0004568 A1 | 1/2002 | Cohen et al. | |

FOREIGN PATENT DOCUMENTS

| | | |
|---|---|---|
| EP | 0 095 919 A2 | 12/1983 |
| EP | 0 274 888 A1 | 7/1988 |
| EP | 0 337 976 B1 | 10/1989 |
| GB | 1 208 585 | 10/1970 |
| WO | WO 2005042624 A1 | 5/2005 |

OTHER PUBLICATIONS

A. Y. Coran, et al., Rubber-Thermoplastic Compositions. Part V. Selecting Polymers for Thermoplastic Vulcanizates, Rubber Chemistry and Technology, 1982, 116-136, vol. 55.

* cited by examiner

*Primary Examiner*—Jeffrey B. Robertson

(57) ABSTRACT

A curable thermoplastic elastomeric blend comprising: (a) from 15 to 60 weight percent of a polyalkylene phthalate polyester polymer or copolymer and; (b) from 40 to 85 weight percent of a polyacrylate or polyethylene/acrylate rubber in combination with an effective amount of peroxide free-radical initiator and an organic diene co-agent to cross-link which upon extrusion or injection molding dynamically cross-link producing a melt processible thermoplastic elastomeric composition having a polyalkylene phthalate polyester polymer or copolymer continuous phase and of a cross-linked polyacrylate or polyethylene/acrylate rubber disperse phase. Such compositions are useful in the manufacture of rubber parts having excellent resistance to lubricating oils and greases.

28 Claims, 3 Drawing Sheets

CURABLE THERMOPLASTIC ELASTOMERIC BLEND, METHOD OF MANUFACTURE, AND USE THEREOF

CROSS-REFERENCE TO RELATED APPLICATIONS

Applicant claims the benefit of priority to provisional application 60/414,708 filed Sep. 30, 2002; herein incorporated by reference in its entirety.

BACKGROUND OF THE INVENTION

1. Field of the Invention

The present invention relates to curable thermoplastic elastomeric blends, their manufacture and use to make injection or extrusion molded rubber articles. More specifically but not by way of limitation, the present invention relates to blends of (i) a thermoplastic polyester (e.g., polyalkylene phthalates such as polyethylene terephthalate, PET, polybutylene terephthalate, PBT, related copolymers thereof and the like) or a thermoplastic polyester elastomer (e.g., polyether esters such as block copolymers consisting of segments of polybutylene terephthalate and segments of long-chain polyether glycols or the like) and (ii) a non-functionalized, cross-linkable, polyacrylate or polyethylene/acrylate vulcanizate rubber (e.g., polyacrylate (ACM) type elastomer, and polyethylene/acrylate (AEM) type elastomer) in combination with a peroxide free radical initiator and diene-type coagent for cross-linking.

2. Description of the Related Art

It is generally known in the art and an accepted commercial practice to employ curable polyacrylate elastomers to manufacture high performance rubber parts having excellent resistance to lubricating oils and greases which are therefore useful in selected automotive applications and the like. Typically, these manufacturing processes involve a gum rubber vulcanizate and a cross-linking curative system, which because of rheological properties require physical blending, compression molding and subsequent curing to make thermoset molded parts, wherein runners, sprues and other scrap is not recyclable consequently driving up costs. Categorically the gum rubber vulcanizates are either polyacrylate elastomer (ACM) derived from copolymerization of acrylic acid ester monomers (e.g., ethyl, butyl, and methoxyethyl acrylate and can include some vinyl acetate), polyethylene/acrylate elastomer (AEM) derived from copolymerization of ethylene monomer and acrylic acid ester monomers (e.g. ethylene and methyl acrylate and can include other comonomers and grafts, see for example U.S. 2002/0004568 A1 incorporated herein by reference), or polyperfluoroalkyl acrylate elastomer (FPA) derived from polymerization of fluorinated acrylic ester monomer (e.g., 1,1 dihydroperfluoro-n-butyl acrylate). It is also generally known that the polyacrylate elastomer can be functionalized by incorporating a relatively small amount of an additional comonomer such as an acrylate glycidyl ester, maleic acid or other comonomer having a reactive group present including acid, hydroxyl, epoxy, isocyanate, amine, oxazoline, chloroacetate or diene. These functionalized polyacrylate elastomers can then be advantageously cured using a curative co-agent containing functional groups that covalently bond to the functionalized reactive cites of the polyacrylate elastomer.

One problem associated with the prior art curable polyacrylate elastomers is the inherent rheological limitations of high viscosity and low melt flow of their cured or partially cured state. Consequently, physical blending followed by compression molding and subsequent curing is usually necessary to achieve acceptable properties rather than extrusion or injection molding directly to a finished part (as discussed above). However, in European Patent 0 337 976 B1 and in U.S. Pat. No. 4,981,908 thermoplastic elastomer compositions are disclosed comprising of blends of polyester resin (including segmented polyetherester elastomers commercially available under the trademark Hytrel® from E.I. du Pont de Nemours and Company) and dynamically vulcanized, covalently cross-linked acrylate rubber (including ethylene/methyl acrylate terpolymer containing about one mole percent of a carboxylic acid containing comonomer commercially available under the trademark Vamac® from E.I. du Pont de Nemours and Company). The covalent cross-linking in these disclosures is achieved by employing a functionalized polyacrylate elastomer in combination with reactive difunctional cross-linking agent. However, almost all of these difunctional cross-linking agents can also react with the ester units in the polyalkylene phthalates (i.e., an amine, hydroxyl or carboxylic acid group will exchange with the ester groups and epoxy or acid groups will add to the hydroxyl end groups), which leads to high viscosity and lack of reproducibility.

In an article entitled "Rubber-Thermoplastic Compositions. Part V. Selecting Polymers for Thermoplastic Vulcanizates"; A. Y. Coran, R. P. Patel, and D. Williams, Rubber Chemistry Technology, Volume 55, pages 116–136 (1982), approximately 100 thermoplastic vulcanizate compositions, based on 9 kinds or thermoplastic resin and 11 kinds of rubber, were prepared by dynamic vulcanization (i.e., rubber cured during mixing with molten plastic). At page 121 of the publication it is asserted that ethylene vinyl acetate (EVA) rubber must be peroxide cured and no sufficiently stable peroxide curative is known for use at high temperature required for polybutylene terephthalate melt mixing (referred to as PTMT, polytetramethylene terephthalate). This article also discloses a dynamic vulcanizate of PTMT and a ACM rubber (Elaprin® AR153) which was a commercially available blend of an ethylacrylate/acrylic acid (99/1 parts by weight) copolymer rubber and 3 parts by weight diglycidyl ether of bisphenol A cross-linking agent, see for example page 8 of EP 0 095 919 A2.

In contrast to the above mentioned dynamically vulcanized, thermoplastic elastomer compositions based on a blend of a polyester, a functionalized acrylate rubber and a rubber phase cross-linking agent, GB 1 208 585 discloses and exemplifies a melt-shapeable polymer compositions based on polyethylene terephthalate blended with an ethylene copolymer rubber (with or without cross-linking cites) and a polyisocyanate chain extending agent that in a preferred embodiment also cross-links the functionalized rubber.

In U.S. Pat. No. 4,275,180, a polymer composition comprising a cross-linked blend of an elastomer and a thermoplastic polymer substantially free of halogen is disclosed. Examples specifically include a functionalized ethylene/methyl acrylate terpolymer rubber (Vamac®) blended with segmented polyetherester copolymer (Hytrel®). This reference teaches cross-linking by any conventional method including irradiation or chemical cross-linking such as by the use of peroxide. However, all examples employ high intensity radiation (e.g., 12 Mrads) in the presence of a co-agent (triallyl cyanurate). In a subsequently published patent application EP 0 274 888 A1 a halogen-free, aluminum trihydrate filled thermoplastic elastomer composition is taught. Comparative examples 1 and 2 specifically reference the ingredients and procedures of the examples in U.S. Pat. No. 4,275,180 and along with operative Example 3 employ 15 Mrads of ionizing radiation to cross-link a Hytrel®/Vamac® blend in the presence of triallyl cyanurate co-agent. At page 7 of this reference it is stated that in some cases it may be desirable to add to the cross-linkable polymer composition a co-agent to assist in the cross-linking reaction. It is then taught that such co-agents usually contain multiple unsaturated groups that are believed to react with the initial radical formed on the polymer backbone to form a more stable radical, which undergoes coupling reaction to form cross-links more readily than chain scission reaction. Triallyl cyanurate is acknowledged as a co-agent. In contrast to the irradiation induced cross-linking examples, all of the operative examples employing a peroxide curing agent (i.e., free-radical initiator) were free of triallyl cyanurate or other co-agent.

BRIEF SUMMARY OF THE INVENTION

It has now been discovered that curable thermoplastic elastomeric blends can be made using a "non-functionalized" polyacrylate-type vulcanizate in combination with a free-radical peroxide initiator and a diene or higher polyene type curative co-agent for cross-linking. The other polymeric constituent of the blend is a polyalkylene phthalate thermoplastic polyester and in particular thermoplastic polyetherester elastomer such as block copolymers consisting of segments of polybutylene terephthalate and segments of long-chain polyether glycols. The curable thermoplastic elastomeric blends of the present invention are amenable to dynamic cross-linking during the extrusion or injection molding of starting components resulting in a melt processible thermoplastic elastomeric composition having a cross-linked polyacrylate rubber as the dispersed phase and polyalkylene phthalate polyester polymer as the continuous phase. Furthermore and as illustrated in the examples herein, the selection of the starting materials and choice of free-radical initiator advantageously leads to control of the polymer morphology of the resulting dispersed rubber phase and resulting articles of manufacture.

Thus, the present invention provide a curable thermoplastic elastomeric blend comprising:
(a) from 15 to 60 weight percent of a polyalkylene phthalate polyester polymer or copolymer and;
(b) from 40 to 85 weight percent of a cross-linkable poly(meth)acrylate or polyethylene/(meth)acrylate vulcanizate rubber in combination with an effective amount of peroxide free-radical initiator and an organic diene co-agent to cross-link said rubber during extrusion or injection molding of said curable thermoplastic elastomeric blend.

The present invention further provides a melt processible thermoplastic elastomeric composition comprising:
(a) from 15 to 60 weight percent of a polyalkylene phthalate polyester polymer or copolymer continuous phase and;
(b) from 40 to 85 weight percent of a cross-linkable poly(meth)acrylate or polyethylene/(meth)acrylate vulcanizate rubber disperse phase wherein said polyacrylate rubber is cross-linked with a peroxide free-radical initiator and an organic diene co-agent.

The instant invention also provides a process for manufacture of a melt processible thermoplastic elastomeric composition comprising the steps of:
(a) adding and admixing a cross-linkable poly(meth)acrylate or polyethylene/(meth)acrylate vulcanizate rubber, a peroxide free-radical initiator and an organic diene co-agent in a melt extruder or melt blender at a temperature insufficient to promote cross-linking;
(b) adding a polyalkylene phthalate polyester polymer to said melt extruder or melt blender and admixing said polyalkylene phthalate polyester polymer with said cross-linkable poly(meth)acrylate or polyethylene/(meth)acrylate vulcanizate rubber prior to cross-linking;
(c) further mixing said cross-linkable poly(meth)acrylate or polyethylene/(meth)acrylate vulcanizate rubber with peroxide free-radical initiator and an organic diene co-agent with said polyalkylene phthalate polyester polymer at conditions and temperature sufficient to cross-link said cross-linkable poly(meth)acrylate or polyethylene/(meth)acrylate vulcanizate rubber; and
(d) recovering a melt processible thermoplastic elastomeric composition comprising from 15 to 60 weight percent of said polyalkylene phthalate polyester polymer or copolymer as a continuous phase and from 40 to 85 weight percent of said poly(meth)acrylate or polyethylene/(meth)acrylate vulcanizate rubber cross-linked with said peroxide free-radical initiator and said organic diene co-agent as a disperse phase.

And the present invention provides a shaped or molded article made from a melt processible thermoplastic elastomeric composition comprising:
(a) from 15 to 60 weight percent of a polyalkylene phthalate polyester polymer or copolymer continuous phase and;
(b) from 40 to 85 weight percent of a poly(meth)acrylate or polyethylene/(meth)acrylate rubber disperse phase wherein said poly(meth)acrylate or polyethylene/(meth)acrylate rubber is cross-linked with a peroxide free-radical initiator and an organic diene co-agent.

Typically the polyalkylene phthalate polyester polymer or copolymer is selected from the group consisting of polyalkylene terephthalate, polyalkylene terephthalate copolymer, polyether ester of polyalkylene terephthalate, and polyether ester of polyalkylene terephthalate copolymer and preferably is a block copolymer of segments of polybutylene terephthalate and segments of poly(tetramethylene ether) glycol. Typically the poly(meth)acrylate rubber is selected from the group consisting of polyacrylate elastomer and polyethylene/acrylate elastomer and is preferably an ethylene/methylacrylate copolymer elastomer. According to the instant invention the organic diene co-agent is conveniently selected from the group consisting of diethylene glycol diacrylate, diethylene glycol dimethacrylate, N,N'-m-phenylene dimaleimide, and triallylisocyanurate and the free radical initiator is selected from the group consisting of 2,5-dimethyl-2,5-di-(t-butylperoxy) hexyne-3, and t-butyl peroxybenzoate. The specific combination of a block copolymer of segments of polybutylene terephthalate and segments of poly(tetramethylene ether) glycol as the continuous thermoplastic phase along with an ethylene/methylacrylate copolymer elastomer, 2,5-dimethyl-2,5-di-(t-butylperoxy) hexyne-3 or 2,5-dimethyl-2,5-di-(t-butylperoxy) hexane free-radical initiator and diethylene glycol dimethacrylate co-agent produces a highly dispersed rubber phase with excellent properties.

DETAILED DESCRIPTION OF THE INVENTION

Figure 1:
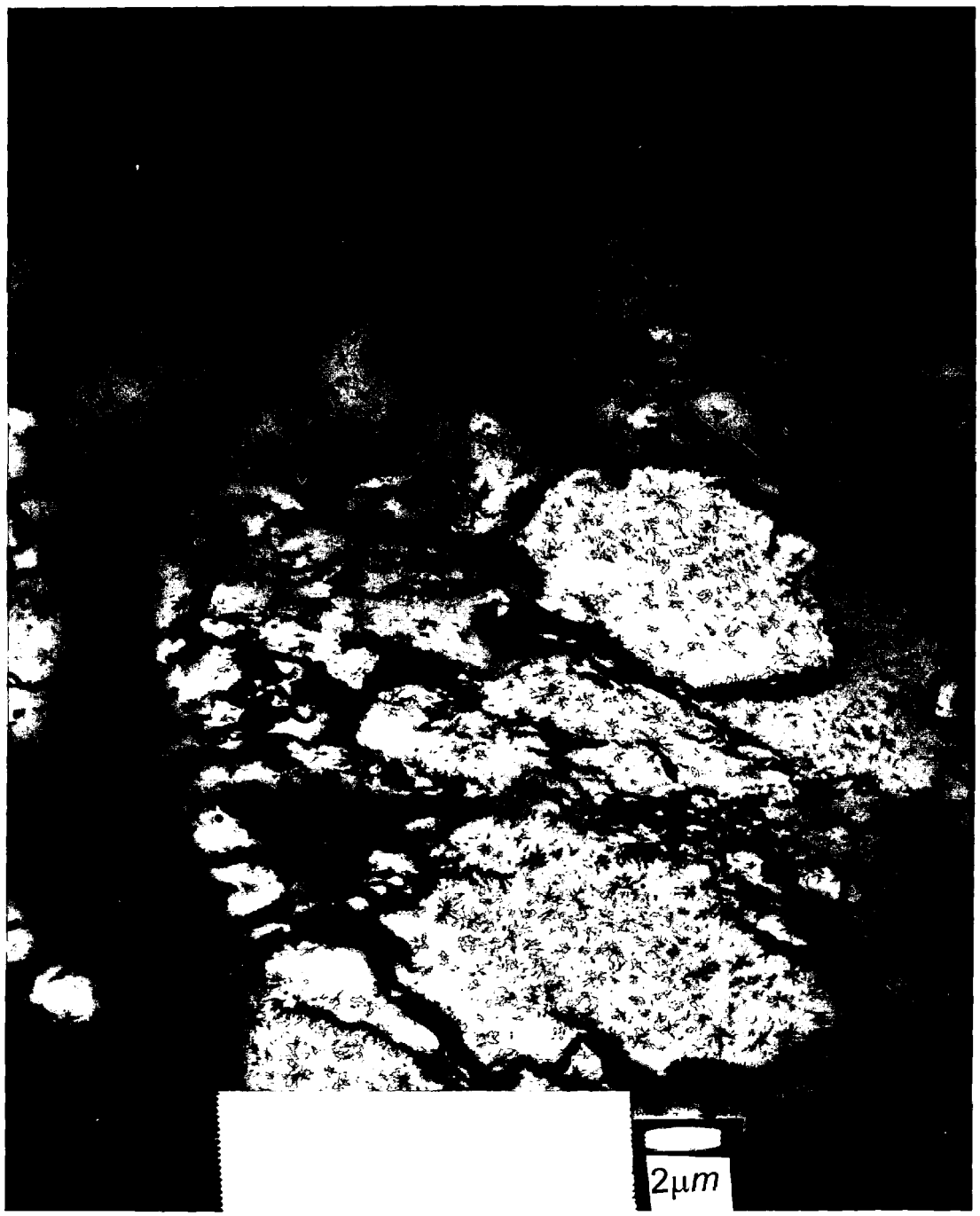
FIG. 1 represents a TEM photograph of a resulting rubber article (for relatively high rate of reaction of the free-radical initiator and resulting relatively large domain polymer morphology), according to the process of the instant invention.

In describing and/or claiming this invention, the term "copolymer" is used to refer to polymers containing two or more monomers and in the case of an alternating essential co-monomer derived polymer, such as polyalkylene terephthalate polyester and the like, the term "copolymer" is used to refer to the presence of at least one additional monomer other than the essential co-monomers. The use of the term terpolymer and/or termonomer means that the copolymer has at least three different comonomers. "Consisting essentially of" means that the recited components are essential, while smaller amounts of other components may be present to the extent that they do not detract from the operability of the present invention. The term "(meth)acrylic acid" refers to methacrylic acid and/or acrylic acid, inclusively. Likewise, the term "(meth)acrylate" means methacrylate and/or acrylate and "poly(meth)acrylate means polymers derived from the polymerization of either or a mixture of both corresponding type of monomers. The term "vulcanizate" and the phrase "vulcanizate rubber" as used herein are intended to be generic to the cured or partially cured, cross-linked or cross-linkable rubber as well as curable precursors of cross-linked rubber and as such include elastomers, gum rubbers and so-called soft vulcanizates as commonly recognized in the art. The use of the phrase "organic diene co-agent" is intended to mean organic co-agents that contain two or more unsaturated double bonds. The phrase "rubber phase" and "thermoplastic phase" as used herein refer to and mean the polymeric morphological phases present in the resulting thermoplastic elastomeric blends derived from mixing and dynamic crosslinking of the cross-linkable acrylate rubber and the polyalkylene terephthalate polyester starting materials, according to the method of the present invention. For purposes of the present invention, an "effective amount" of peroxide free-radical initiator and organic diene co-agent refers to generally the selection and amounts necessary to achieve slow rates of reaction and corresponding desirable high time @ maximum G' rate (and can be quantified for the preferred embodiments as a time @ maximum G' rate of ≧3.9 minutes and higher).

The curable thermoplastic elastomer blends according to the present invention involve the mixing of a thermoplastic and vulcanizate rubber in the presence of an organic peroxide free-radical initiator and organic diene co-agent. Preferably a thermoplastic polyalkylene phthalate polyester polymer or copolymer is admixed with a cross-linkable poly (meth)acrylate or polyethylene/(meth)acrylate vulcanizate. The curable thermoplastic elastomer blend, again according to the instant invention, also has a specific type of cure system present in the blend. More specifically, the curative agent/system involves the combination of a free-radical initiator and an organic diene co-agent. It has now been discovered that the use of the free-radical initiator and diene co-agent without requiring the vulcanizate rubber to be a functionalized polymer, results in a curable thermoplastic blend that can be dynamically cross-linked during melt blending and/or melt fabrication. Thus the curable thermoplastic elastomer blend is extruded, injection molded or the like and the free-radical initiator and diene co-agent will act as a curative agent/system resulting in cross-linking of the rubber vulcanizate, in situ, within the blend.

The resulting dynamically cross-linked product according to the instant invention will itself be a melt processable thermoplastic elastomer composition. As such, dynamically cross-linked product will be thermoformable and recyclable. Typically the resulting melt processable thermoplastic elastomer will be more thermoplastic than its component rubber phase in the absence of the thermoplastic polyester phase and will be more elastic than the thermoplastic polyester phase in the absence of the rubber phase. Furthermore, resulting melt processable thermoplastic elastomer will involve the polyalkylene phthalate polyester polymer or copolymer being present as a continuous phase while the poly(meth)acrylate or polyethylene/(meth)acrylate cross-linked rubber will be present as the dispersed phase.

It has been found that the use of the organic peroxide and diene co-gent curative system according to the present invention leads to better reproducibility and better control of the polymer morphology and physical properties of the resulting dynamically cross-linked thermoplastic elastomer composition. By selecting the relative amounts of reactants and in particular the type of organic peroxide and co-agent the degree of dispersion (average domain size) of the dispersed dynamically cross-linked rubber phase can be selected and controlled. More specifically and as later illustrated in the examples, the use of an organic peroxide and co-agent that exhibits a slower cure rate under a relatively modest or low initial melt blending temperature leads to improved mixing of the thermoplastic polymer phase and the gum rubber phase prior to a temperature rise and cross-linking. This in turn results in improved dispersion of the resulting cross-linked rubber phase dispersed in the continuous thermoplastic phase. The unexpected degree of control and reproducibility affords optimization of properties such as compression set, shore hardness, increased elastic modulus during cure and the like. For example, at a compositional ratio of twenty-five weight percent polyalkylene terephthalate and seventy-five weight percent polyethylene/acrylate dispersed rubber phase an optimal compression set of ≦40% at 100° C., 22 hours, can be achieved according to the present invention.

The thermoplastic component useful in the present invention is categorically any thermoplastic polyalkylene phthalate polyester or related copolymer thereof. Typically such polymers and copolymers may be prepared by polymerization of one or more isomers of phthalic acid, phthalic acid anhydrides, or corresponding esters with one or more comonomer diols by any of the polymerization methods commonly practiced in the art. Preferably the dominant phthalate isomer is terephthalate and the dominant diol is either ethylene glycol or 1,4 n-butane diol. Most preferably, 1,4 n-butane diol is employed producing a polybutylene terephthalate polymer or copolymer thereof. Various comonomers can be employed again as generally known in the art. Thus other dicarboxylic acids, dicarboxylic acid anhydrides and their esters and other diols as well as lactones and the like may advantageously be copolymerized with the polyalkylene terephthalate. Such copolymers can either be random copolymers of block copolymers of PET or PBT. One particularly preferred type of copolymer is categorically a polyether polyester consisting essentially of segments of polybutylene terephthalate and segments of long-chain polyether glycols commercially available from E. I. du Pont de Nemours and Company of Wilmington, Del. under the tradename Hytrel®.

The cross-linkable polymeric vulcanizate rubber useful in the present invention is categorically an acrylate-type rubber. Typically such vulcanizates are linear copolymers derived by the copolymerization of more than one acrylic acid ester or methacrylic acid ester or mixtures thereof or are derived by the copolymerization of ethylene and one or more acrylic acid ester or methacrylic acid ester and mixtures. Where the acrylate rubber contains a major amount of ethylene, the acrylate can be little as 6.5 mole %, but for optimally low compression set the acrylate should be above 20 mole %. For purposes of this invention, such poly(meth) acrylates and polyethylene/(meth)acrylates are essentially linear copolymers which are capable of cross-linking with the use of an organic peroxide and organic diene co-agent curative system. As such, the poly(meth)acrylate and polyethylene/(meth)acrylate copolymers do not require the presence of a functionalized termonomer. However it is contemplated that the mere presence of small amounts of intentionally added functionalized comonomer for specific end use properties is within the scope of the present invention provided that such functionality does not deleteriously affect the cure rate achieved during dynamic cross-linking by free-radical initiation. Also, it is contemplated that for purposes of this invention certain polyperfluoroalkyl acrylate (FPA) type vulcanizates based on monomers such as 1,1 dihydroperfluoro-n-butyl acrylate and fluorinated copolymers derived from vinylidene fluoride and hexafluoropropylene should be considered equivalent to the acrylate type rubber vulcanizate. Most preferably the cross-linkable acrylate rubber is a copolymer of ethylene and one or more alkyl esters of acrylic acid, methacrylic acid or mixtures wherein the relative mount of ethylene copolymerized with the acrylic acid esters (i.e., the alkyl acrylate) is less than 60 weight percent and the alkyl acrylate represents greater than 40 weight percent of the copolymer.

The curative system useful in the present invention involves a free-radical polymerization initiator that decomposes rapidly at the temperature of dynamic cross-linking but not at the melt temperature of mixing of components. These include, for example, 2,5-dimethyl-2,5-di-(t-butylperoxy) hexyne-3, t-butyl peroxybenzoate, 2,5-dimethyl-2,5-di-(t-butylperoxy)-2,5-dimethylhexane, dicumyl peroxide, α,α-bis(t-butylperoxy)-2,5-dimethylhexane, and the like. Preferably, free-radical initiator is 2,5-dimethyl-2,5-di-(t-butylperoxy) hexyne-3; 2,5-dimethyl-2,5-di-(t-butylperoxy) hexane; or t-butyl peroxybenzoate.

The cross-linking co-agent useful in the present invention is an organic diene as generally known in the art. The co-agent can be, for example, diethylene glycol diacrylate, diethylene glycol dimethacrylate, N,N'-m-phenylene dimaleimide, triallylisocyanurate, trimethylolpropane trimethacrylate, tetraallyloxyethane, triallyl cyanurate, tetramethylene diacrylate, polyethylene glycol dimethacrylate, and the like. Preferably the co-agent is either diethylene glycol diacrylate, diethylene glycol dimethacrylate, N,N'-m-phenylene dimaleimide, or triallylisocyanurate.

The actual mixing of components and subsequent dynamic cross-linking in principle can be performed either in a batch mode or a continuous mode using conventional melt blending equipment as generally practiced in the art. Preferably, the process is performed continuously in a melt extruder or injection molding apparatus. The critical consideration is to perform the steps such that one takes advantage of the slow rate of cure at low temperatures; thus, achieving significant mixing and dispersion prior to cross-linking. In this manner the subsequent higher temperature will cross-link the rubber phase after a higher level of dispersion has been accomplished.

The dynamically cross-linked thermoplastic elastomer compositions according to the present invention can be advantageously modified by the addition of various types of fillers, pigments, stabilizers, antioxidants, and the like as generally known in the art. Preferably the melt processible thermoplastic elastomeric composition is stabilized with a combination of polyamide and antioxidant as taught in U.S. Pat. No. 3,896,078; herein incorporated by reference.

The following examples are presented to more fully demonstrate and further illustrate various aspects and features of the present invention. As such, the showings are intended to further illustrate the differences and advantages of the present invention but are not meant to be unduly limiting.

EXAMPLES 1 THROUGH 16

A series of sixteen different blends according to the instant invention were prepared and evaluated. The thermoplastic used was polyetherester block copolymer with a melt flow rate (ISO 133) of 18 g/10 minutes, a melting temperature (ISO 3146C) of 203° C., and a density (ISO 1183) of 1.19 g/cm$^3$. The polyetherester block copolymer consisted of a hard (crystalline) segment of polybutylene terephthalate and a soft (amorphous) segment based on long-chain polyether glycols commercially available as Hytrel® from E.I. du Pont de Nemours and Company of Wilmington, Del. The polyacrylate rubber used was a polyethylene/acrylate elastomer (gum rubber type) derived from copolymerization of ethylene and 63% by weight methyl acrylate commercially available as Vamac® from E.I. du Pont de Nemours and Company of Wilmington, Del. The blends were prepared using various peroxide type free-radical initiators in combination with selected diene co-agents at various concentrations as detailed in the following Table 1. The peroxide are further characterized in Table 1 by their respective elevated temperature corresponding to a free radical half-life of one hour.

To determine the cure rate of the elastomer with a given peroxide and coagent, blends of the gum rubber, organic peroxide, and coagent were made on a Brabender mixer at a maximum mix temperature of about 90° C. for about 2 minutes. These conditions are well below the temperature and time at which any significant cross-linking reaction would take place with the particular combinations of peroxide and coagent that were used. Cure rate of these blends was then determined using an Alpha Technologies Advanced Polymer Analyzer APA 2000, parallel plate die, 2.583 mm die gap, 100.0 cpm frequency, 0.500 deg strain, at 180° C. Samples were cured for 16 minutes total in the APA analyzer, and various viscosity related data was monitored. The time at maximum G' rate m.m (i.e., the elapsed time during the cure process at which the elastic modulus was seeing the greatest rate of increase, expressed in decimal minutes) was used to indicate cure rate of the elastomer and is reported in Table 1. This parameter is felt to most closely relate to the dynamic vulcanization conditions in the actual thermoplastic/elastomer extrusion compounding process.

Corollary compositions (i.e., the same peroxide and coagent concentrations in the elastomer phase as were used in the elastomer cure rate experiments) were then dynamically compounded and cross-linked, with the thermoplastic phase present. These samples were compounded on a Berstorff 25 mm twin-screw extruder. In this compounding operation, the gum rubber was metered into extruder barrel 1 at a controlled rate using an auger type elastomer feeder controlled at about 100° C. Zones 1 to 3 of the twin-screw extruder were also controlled at 100° C. Liquid co-agent was pumped into barrel 2 of the extruder, and peroxide into barrel 3, the liquids being mixed into the gum rubber with gear mixers. In cases where the co-agent could not be pumped, it was mill-blended into the gum rubber before charging to the auger type elastomer feeder, but the peroxide was pumped into barrel 3 of the extruder in all cases. The auger type feeder and barrels 1 to 3 of the twin-screw extruder were maintained at a low temperature to avoid curing of the elastomer before the thermoplastic phase was present. Barrels 4 to 8 of the extruder were controlled at 225° C. The polyetherester block copolymer thermoplastic phase entered the extruder at barrel 4 at a controlled rate using a weight loss feeder and an extruder side stuffer. An intense series of kneading blocks followed thermoplastic phase addition. The kneading blocks served to both disperse the elastomer in the thermoplastic phase and raise the temperature so that the cure would take place. A vacuum port followed the reaction zone of the extruder and served to remove any volatiles. Material exited the extruder through a 4-hole strand die, and was water quenched and cut into pellet form. Melt temperature at the die exit of the extruder was 250 to 260° C.

The material was then dried 16 hours in a desiccant oven at 80° C. and injection molded into 3 inch by 3 inch by ⅛ inch plaques and ⅛ inch microtensile bars. Injection molding barrel temperature was controlled at 225° C. Injection times and pressures were chosen to properly fill the parts.

Samples were then tested for Compression Set, ASTM D395-89, Test Method B—Compression Set Under Constant Deflection in Air. Conditions were 100° C. for 22 hours. Before testing, plaques were annealed at 120° C. for 16 hours so that the effect of crystallization of the thermoplastic polyetherester continuous phase while the sample was under compression set testing conditions would not influence the compression set result. Discs of the proper diameter (1.14"±0.02") for compression set testing were die cut from the 3"×3"×⅛" plaques and tacked to the proper height (0.49"±0.02"). For TEM analysis of particle size, a portion of each sample was removed from the plaque transverse to the flow direction. 90 nanometer thick sections were obtained using a Reichert-Jung cryoultramicrotome and diamond knife at a temperature setting of about 90° C. The sections were collected on copper mesh grids and exposed to $RuO_4$ vapor for 2 hours (to stain the polyester). Images were obtained using a JEOL 1200EX Transmission Electron Microscope operated at 120 KV and recorded on sheet film. The TEM photographs were then visually evaluated and given a subjective value as to typical size of the rubber phase. Shore A hardness was determined according to ASTM D 2240-5.

Figure 2:
FIG. 2 represents a TEM photograph of a resulting rubber article (for relatively low rate of reaction of the free-radical initiator and resulting relatively highly dispersed domain polymer morphology), according to the process of the instant invention.
Figure 3:
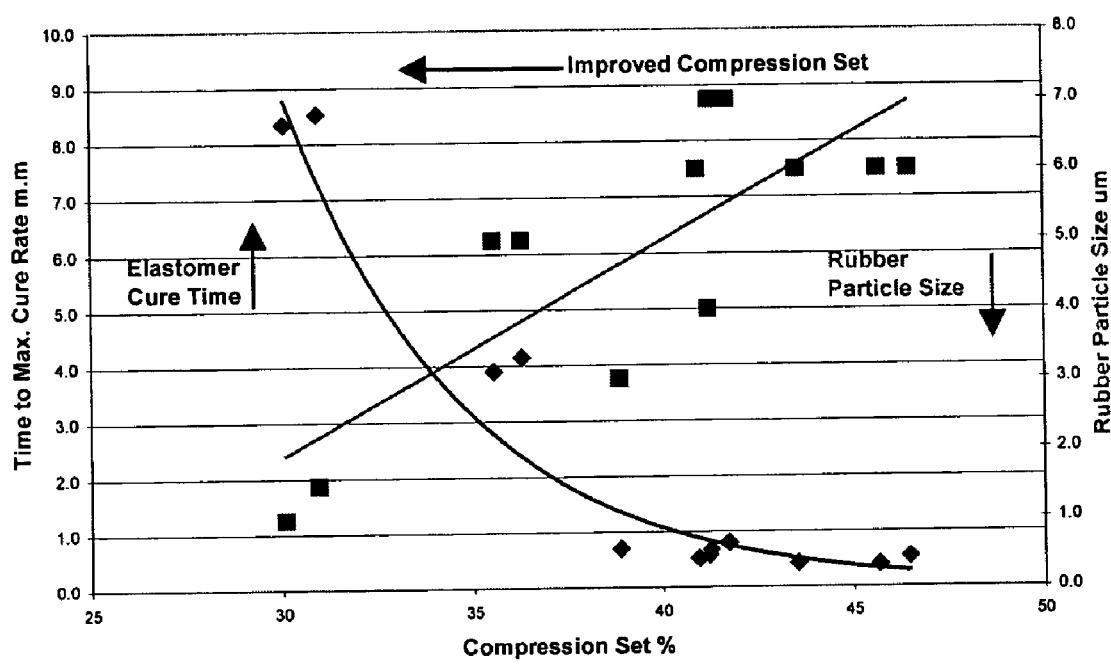
FIG. 3 is a superimposed plot illustrating a linear decreasing rubber particle size and asymptotic decreasing compression set with increasing time to maximum cure rate characteristic of the instant invention.

The respective compositions and resulting data are presented in Table 1. The resulting percent compression set and the average rubber particle size are plotted as a function of the time to maximum cure rate in FIG. 3. The results show that desirable low compression set values are achieved when the time @ max G' rate is high, indicating a slower cure during the dynamic vulcanization relative to samples with higher compression set values. FIGS. 1 and 2 correspond to TEM photographs of a resulting rubber article (for relatively high rate of reaction of the free-radical initiator and resulting relatively large domain polymer morphology) and (for relatively low rate of reaction of the free-radical initiator and resulting relatively highly dispersed domain polymer morphology), both according to the process of the instant invention. Collectively the data shows that a compression set of ≦46 at 100° C. and 22 hours is achieved along with a Shore A hardness of ≧59 when peroxides with a one-hour half life time at 125° C. and preferably 140° C. or even 152° C. is employed, according to the instant invention. This is particular evident when the selection of peroxide, coagent, and elastomer exhibit a slow time to maximum cure rate (Time @ Max G' rate in decimal minutes) of ≧3.9 minutes (and preferably approaching 8 minute or greater).

EXAMPLES 17 THROUGH 20

In a manner analogous to Examples 1 through 16, a series of four additional blends of the polyetherester block copolymer and the polyethylene/acrylate elastomer were prepared and evaluated. Four different coagents characterized as having relatively high temperature one-hour half-life of 152° C. and 140° C. and thus a relatively slow cure rate as witnessed by the time @ max G' rate being relatively high. Again the results, as presented in Table 2, show that desirable low compression set values are achieved when the time @ max G' rate is high, indicating a slower cure during the dynamic vulcanization relative to samples with higher compression set values.

TABLE 1

| Example # | E/MA Rubber | Thermoplastic Phase | Hytrel ® % (1) | Peroxide Type | Peroxide Wt. % of E/MA | Peroxide 1 hr. T½ deg. C. | Coagent Type |
|---|---|---|---|---|---|---|---|
| 1 | E/63MA | Hytrel ® 5526 | 25 | 2,5-Dimethyl-2,5-di-(t-butylperoxy)hexyne-3 | 2 | 152 | diethylene glycol diacrylate |
| 2 | E/63MA | Hytrel ® 5526 | 25 | 2,5-Dimethyl-2,5-di-(t-butylperoxy)hexyne-3 | 2.5 | 152 | diethylene glycol diacrylate |
| 3 | E/63MA | Hytrel ® 5526 | 25 | t-Butyl Peroxybenzoate | 0.75 | 125 | diethylene glycol diacrylate |
| 4 | E/63MA | Hytrel ® 5526 | 25 | t-Butyl Peroxybenzoate | 1.5 | 125 | diethylene glycol diacrylate |
| 5 | E/63MA | Hytrel ® 5526 | 25 | 2,5-Dimethyl-2,5-di-(t- | 2 | 152 | diethylene glycol dimethacrylate |

TABLE 1-continued

| Example # | E/MA Rubber Type | Thermoplastic Phase | Hytrel® % (1) | Peroxide Type | Peroxide Wt. % of E/MA | Peroxide 1 hr. T½ deg. C. | Coagent Type |
|---|---|---|---|---|---|---|---|
| 6 | E/63MA | Hytrel® 5526 | 25 | 2,5-Dimethyl-2,5-di-(t-butylperoxy)hexyne-3 | 2.5 | 152 | diethylene glycol dimethacrylate |
| 7 | E/63MA | Hytrel® 5526 | 25 | t-Butyl Peroxybenzoate | 0.75 | 125 | diethylene glycol dimethacrylate |
| 8 | E/63MA | Hytrel® 5526 | 25 | t-Butyl Peroxybenzoate | 1.5 | 125 | diethylene glycol dimethacrylate |
| 9 | E/63MA | Hytrel® 5526 | 25 | 2,5-Dimethyl-2,5-di-(t-butylperoxy)hexyne-3 | 2 | 152 | N,N'-m-Phenylene Dimaleimide |
| 10 | E/63MA | Hytrel® 5526 | 25 | t-Butyl Peroxybenzoate | 0.75 | 125 | N,N'-m-Phenylene Dimaleimide |
| 11 | E/63MA | Hytrel® 5526 | 25 | 2,5-Dimethyl-2,5-di-(t-butylperoxy)hexyne-3 | 2.5 | 152 | N,N'-m-Phenylene Dimaleimide |
| 12 | E/63MA | Hytrel® 5526 | 25 | t-Butyl Peroxybenzoate | 1.5 | 125 | N,N'-m-Phenylene Dimaleimide |
| 13 | E/63MA | Hytrel® 5526 | 25 | 2,5-Dimethyl-2,5-di-(t-butylperoxy)hexyne-3 | 2 | 152 | Triallylisocyanurate |
| 14 | E/63MA | Hytrel® 5526 | 25 | t-Butyl Peroxybenzoate | 0.75 | 125 | Triallylisocyanurate |
| 15 | E/63MA | Hytrel® 5526 | 25 | 2,5-Dimethyl-2,5-di-(t-butylperoxy)hexyne-3 | 2.5 | 152 | Triallylisocyanurate |
| 16 | E/63MA | Hytrel® 5526 | 25 | t-Butyl Peroxybenzoate | 1.5 | 125 | Triallylisocyanurate |

| Example # | Coagent % of E/MA Rubber | Shore A Hardness Inj. Mold | Annealed Inj. Mold Comp Set 100C 22 hr. % | Elastomer Cure: Time @ Max G' Rate m·m | Typical Particle Size μm |
|---|---|---|---|---|---|
| 1 | 3.85 | 59 | 41 | 0.6 | 4.0 |
| 2 | 5.66 | 63 | 41 | 0.5 | 6.0 |
| 3 | 3.85 | | | 0.5 | |
| 4 | 5.66 | 63 | 46 | 0.5 | 6.0 |
| 5 | 3.85 | 60 | 31 | 8.5 | 1.5 |
| 6 | 5.66 | 62 | 30 | 8.3 | 1.0 |
| 7 | 3.85 | | | 0.9 | |
| 8 | 5.66 | | | 0.8 | |
| 9 | 1.96 | 65 | 41 | 0.7 | 7.0 |
| 10 | 1.96 | 64 | 46 | 0.4 | 6.0 |
| 11 | 3.85 | 65 | 39 | 0.7 | 3.0 |
| 12 | 3.85 | 69 | 44 | 0.4 | 6.0 |
| 13 | 1.96 | 66 | 36 | 4.2 | 5.0 |
| 14 | 1.96 | | | 0.8 | |
| 15 | 3.85 | 69 | 36 | 3.9 | 5.0 |
| 16 | 3.85 | 68 | 42 | 0.8 | 7.0 |

(1) Weight % based on weight of E/MA plus Hytrel® only.
* Samples where no compression set value is listed could not be injection molded as the composition was too tacky to be pelletized and fed to the injection molding equipment

TABLE 2

| Example # | E/MA Rubber Type | Thermoplastic Phase | Hytrel® % (1) | Peroxide Type | Peroxide Wt. % of E/MA | Peroxide 1 hr. T½ deg. C. | Coagent Type |
|---|---|---|---|---|---|---|---|
| 17 | | Hytrel® 5526 | 25 | 2,5-Dimethyl-2,5-di-(t-butylperoxy)hexyne-3 | 2.5 | 152 | ethylene glycol dimethacrylate |
| 18 | | Hytrel® 5526 | 25 | 2,5-Dimethyl-2,5-di-(t-butylperoxy)hexyne-3 | 2.5 | 152 | diethylene glycol dimethacrylate |

TABLE 2-continued

| | | | | | | |
|---|---|---|---|---|---|---|
| 19 | Hytrel ® 5526 | 25 | 2,5-Dimethyl-2,5-di-(t-butylperoxy) hexyne-3 | 2.5 | 152 | polyethylene glycol (200) dimethacrylate |
| 20 | Hytrel ® 5526 | 25 | 2,5-Dimethyl-2,5-di-(t-butylperoxy) hexane | 2.5 | 140 | diethylene glycol dimethacrylate |

| Example # | Coagent % of E/MA Rubber | Shore A Hardness Inj. Mold | Annealed Inj. Mold Comp Set 100C 22 hr. % | Elastomer Cure: Time @ Max G' Rate m.m | Typical Particle Size μm |
|---|---|---|---|---|---|
| 17 | 2.9 | 64 | 33 | ~6.6 | |
| 18 | 3.5 | 65 | 32 | ~7 | |
| 19 | 4.8 | 64 | 33 | ~7.5 | |
| 20 | 3.5 | 64 | 40 | ~3.2 | |

(1) Weight % based on weight of E/MA plus Hytrel ® only.

EXAMPLES 21 AN 22

Using the procedure described in Examples 1 through 16 the following pair of dynamically compounded elastomer phases were prepared and cross-linked, with the thermoplastic phase present resulting in the following thermoplastic blends.

| Blend | A | B |
|---|---|---|
| VCX-1012 (ethylene/63% methyl acrylate elastomer) | 46.5% | 69.8% |
| Hytrel ® 5556 (butylene/poly(alklene ether) phthalate) | 50% | 25% |
| Antioxidant masterbatch* | 2% | 2% |
| Aztec ® DYBP peroxide** | 2.9%(1) | 2.9%(1) |
| Sartomer ® SR231*** | 4.3%(1) | 4.3%(1) |
| Licolub ® WE40**** (lubricant) | 0.5% | |

(1)percent of E/MA
*The antioxidant masterbatch consisting of:
10% Irganox ® 565; 2,6-di-tert-butyl-4-(4,6-bis(octylthio)-1,3,5-triazin-2-ylamino) phenol
15% Ultranox ® 626; bis (2,4-di-t-butylphenyl) pentaerythritol diphosphite
75% Hytrel ® 5556
**Aztec ® DYBP (CAS 1068-27-5): peroxide curative; 2,5-dimethyl-2,5-di-(t-butylperoxy) hexyne-3
***"Sartomer ® SR231 (CAS 2358-84-1): diethylene glycol dimethacrylate, coagent.
****"Licolub ® WE40: a "complex ester of montanic acids", a montan wax, used as a mold release.

Having thus described and exemplified the invention with a certain degree of particularity, it should be appreciated that the following claims are not to be so limited but are to be afforded a scope commensurate with the wording of each element of the claim and equivalents thereof.

We claim:

1. A curable thermoplastic elastomeric blend comprising:
   (a) from 15 to 60 weight percent of a polyalkylene phthalate polyester polymer or copolymer; and
   (b) from 40 to 85 weight percent of a cross-linkable poly(meth)acrylate vulcanizate rubber or polyethylene/(meth)acrylate vulcanizate rubber in combination with an effective amount of peroxide free-radical initiator and an organic diene co-agent to cross-link said rubber during extrusion or injection molding of said curable thermoplastic elastomeric blend.

2. A curable thermoplastic elastomeric blend of claim 1 wherein said polyalkylene phthalate polyester polymer or copolymer is selected from the group consisting of polyalkylene terephthalate, polyalkylene terephthalate copolymer, polyether ester of polyalkylene terephthalate, and polyether ester of polyalkylene terephthalate copolymer.

3. A curable thermoplastic elastomeric blend of claim 1 or 2 wherein said rubber is selected from the group consisting of polyacrylate elastomer, and polyethylene/acrylate elastomer.

4. A curable thermoplastic elastomeric blend of claim 3 wherein said organic diene co-agent is selected from the group consisting of diethylene glycol diacrylate, ethylene glycol dimethacrylate, diethylene glycol dimethacrylate, polyethylene glycol dimethacrylate, N,N'-m-phenylene dimaleimide, and triallylisocyanurate.

5. A curable thermoplastic elastomeric blend of claim 4 wherein said free radical initiator is selected from the group consisting of 2,5-dimethyl-2,5-di-(t-butylperoxy) hexyne-3, 2,5-dimethyl-2,5-di-(t-butylperoxy) hexane, and t-butyl peroxybenzoate.

6. A curable thermoplastic elastomeric blend of claim 1 wherein said polyalkylene phthalate polyester polymer or copolymer is a block copolymer of segments of polybutylene terephthalate and segments of poly(tetramethylene ether) glycol, said rubber is an ethylene/methylacrylate copolymer elastomer, said peroxide free-radical initiator is 2,5-dimethyl-2,5-di-(t-butylperoxy) hexyne-3 and said organic diene co-agent is diethylene glycol dimethacrylate.

7. A melt processable thermoplastic elastomeric composition comprising:
   (a) from 15 to 60 weight percent of a polyalkylene phthalate polyester polymer or copolymer continuous phase; and
   (b) from 40 to 85 weight percent of a poly(meth)acrylate vulcanizate rubber or polyethylene/(meth)acrylate rubber disperse phase; and in combination with
   (c) an effective amount of a peroxide free-radical initiator and an organic diene co-agent.

8. A melt processable thermoplastic elastomeric composition of claim 7 wherein said polyalkylene phthalate polyester polymer or copolymer is selected from the group consisting of polyalkylene terephthalate, polyalkylene terephthalate copolymer, polyether ester of polyalkylene terephthalate, and polyether ester of polyalkylene terephthalate copolymer.

9. A melt processable thermoplastic elastomeric composition of claim 7 or 8 wherein said poly(meth)acrylate or polyethylene/(meth)acrylate rubber is selected from the group consisting of polyacrylate elastomer, and polyethylene/acrylate elastomer.

10. A melt processable thermoplastic elastomeric composition of claim 9 wherein said organic diene co-agent is selected from the group consisting of diethylene glycol diacrylate, ethylene glycol dimethacrylate, diethylene glycol dimethacrylate, polyethylene glycol dimethacrylate, N,N'-m-phenylene dimaleimide, and triallylisocyanurate.

11. A melt processable thermoplastic elastomeric composition of claim 10 wherein said free radical initiator is selected from the group consisting of 2,5-dimethyl-2,5-di-(t-butylperoxy) hexyne-3,2,5-dimethyl-2,5-di-(t-butylperoxy) hexane, and t-butyl peroxybenzoate.

12. A melt processable thermoplastic elastomeric composition of claim 6 wherein said polyalkylene phthalate polyester polymer or copolymer is a block copolymer of segments of polybutylene terephthalate and segments of poly(tetramethylene ether) glycol, said rubber is an ethylene/methylacrylate copolymer elastomer, said peroxide free-radical initiator is 2,5-dimethyl-2,5-di-(t-butylperoxy) hexyne-3 and said organic diene co-agent is diethylene glycol dimethacrylate.

13. A melt processable thermoplastic elastomeric composition of claim 7 wherein the compression set at 100° C. and 22 hours is $\leq 46$.

14. A melt processable thermoplastic elastomeric composition of claim 7 wherein the Shore A hardness is $\geq 59$.

15. A curable thermoplastic elastomeric blend of claim 1 wherein the cross-linkable poly(met)acrylate or polyethylene/(meth)acrylate vulcanizate rubber in combination with an effective amount of peroxide free-radical initiator and an organic diene co-agent to cross-link said rubber is characterized by a time at maximum G' rate of $\geq 3.9$ minutes when determined using an Alpha Technologies Advanced Polymer Analyzer APA 2000, parallel plate die, 2.583 mm die gap, 100.0 cpm frequency, 0.500 deg strain, at 180° C.

16. A process for manufacture of a melt processable thermoplastic elastomeric composition comprising
    (a) adding and admixing a cross-linkable poly(meth)acrylate vulcanizate rubber or polyethylene/(meth)acrylate vulcanizate rubber, a peroxide free-radical initiator and an organic diene co-agent in a melt extruder or melt blender at a temperature insufficient to promote cross-linking;
    (b) adding a polyalkylene phthalate polyester polymer to said melt extruder or melt blender and admixing said polyalkylene phthalate polyester polymer with said cross-linkable poly(meth)acrylate vulcanizate rubber or polyethylene/(meth)acrylate vulcanizate rubber prior to cross-linking;
    (c) further mixing said cross-linkable poly(meth)acrylate vulcanizate rubber or polyethylenel(meth)acrylate vulcanizate rubber with peroxide free-radical initiator and an organic diene co-agent with said polyalkylene phthalate polyester polymer at conditions and temperature sufficient to cross-link said cross-linkable poly(meth)acrylate vulcanizate rubber or polyethylene/(meth)acrylate vulcanizate rubber; and
    (d) recovering a melt processable thermoplastic elastomeric composition comprising from 15 to 60 weight percent of said polyalkylene phthalate polyester polymer or copolymer as a continuous phase and from 40 to 85 weight percent of said poly(meth)acrylate vulcanizate rubber or polyethylene/(meth)acrylate vulcanizate rubber cross-linked with said peroxide free-radical initiator and said organic diene co-agent as a disperse phase.

17. A process of claim 16 wherein said polyalkylene phthalate polyester polymer or copolymer is selected from the group consisting of polyalkylene terephthalate, polyalkylene terephthalate copolymer, polyether ester of polyalkylene terephthalate, and polyether ester of polyalkylene terephthalate copolymer.

18. A process of claim 16 or 17 wherein said rubber is selected from the group consisting of polyacrylate elastomer, polyethylene/acrylate elastomer and polyperfluoroalkylacrylate elastomer.

19. A process of claim 18 wherein said organic diene co-agent is selected from the group consisting of diethylene glycol diacrylate, diethylene glycol dimethacrylate, N,N'-m-phenylene dimaleimide, and triallylisocyanurate.

20. A process of claim 19 wherein said free radical initiator is selected from the group consisting of 2,5-dimethyl-2,5-di-(t-butylperoxy) hexyne-3,2,5-dimethyl-2,5-di-(t-butylperoxy) hexane, and t-butyl peroxybenzoate.

21. A process of claim 19 wherein said polyalkylene phthalate polyester polymer is a black copolymer of segments of polybutylene terephthalate and segments of poly(tetramethylene ether) glycol, said rubber is an ethylene/methylacrylate copolymer elastomer, said peroxide free-radical initiator is 2,5-dimethyl-2,5-di-(t-butylperoxy) hexyne-3 and said organic diene co-agent is diethylene glycol dimethacrylate.

22. A process of claim 16 wherein admixing of said cross-linkable poly(meth)acrylate or polyethylene/(meth)acrylate vulcanizate rubber, said free-radical initiator and said organic diene co-agent is characterized by a time at maximum G' rate of $\geq 3.9$ minutes when determined using an Alpha Technologies Advanced Polymer Analyzer APA 2000, parallel plate die, 2.583 mm die gap, 100.0 cpm frequency, 0.5 00 deg strain, at 180° C.

23. A shaped or molded article made from a melt processible thermoplastic elastomeric composition comprising:
    (a) from 15 to 60 weight percent of a polyalkylene phthalate polyester polymer or copolymer continuous phase;
    (b) from 40 to 85 weight percent of poly(meth)acrylate vulcanizate rubber or polyethylene/(meth)acrylate rubber disperse phase; and in combination with
    (c) a peroxide free-radical initiator and an organic diene co-agent.

24. A shaped or molded article of claim 23 wherein said polyalkylene phthalate polyester polymer or copolymer is selected from the group consisting of polyalkylene terephthalate, polyalkylene terephthalate copolymer, polyether ester of polyalkylene terephthalate, and polyether ester of polyalkylene terephthalate copolymer.

25. A shaped or molded article of claim 23 or 24 wherein said rubber is selected from the group consisting of polyacrylate elastomer, and polyethylene/acrylate elastomer.

26. A shaped or molded article of claim 25 wherein said organic diene co-agent is selected from the group consisting of diethylene glycol diacrylate, diethylene glycol dimethacrylate, N,N'-m-phenylene dimaleimide, and triallylisocyanurate.

27. A shaped or molded article of claim 26 wherein said free radical initiator is selected from the group consisting of 2,5-dimethyl-2,5-di-(t-butylperoxy) hexyne-3,2,5-dimethyl-2,5-di-(t-butylperoxy) hexane, and t-butyl peroxybenzoate.

28. A shaped or molded article of claim 23 wherein said polyalkylene phthalate polyester polymer or copolymer is a block copolymer of segments of polybutylene terephthalate and segments of poly(tetramethylene ether) glycol, said rubber is an ethylene/methylacrylate copolymer elastomer, said peroxide free-radical initiator is 2,5-dimethyl-2,5-di-(t-butylperoxy) hexyne-3 and said organic diene co-agent is diethylene glycol dimethacrylate.

* * * * *